Jan. 23, 1934.  K. EBNER  1,944,548
PROCESS OF THE SEPARATION OF SOLID SUBSTANCES FROM
LIQUID BY VACUUM COOLING IN STAGES
Filed June 30, 1932
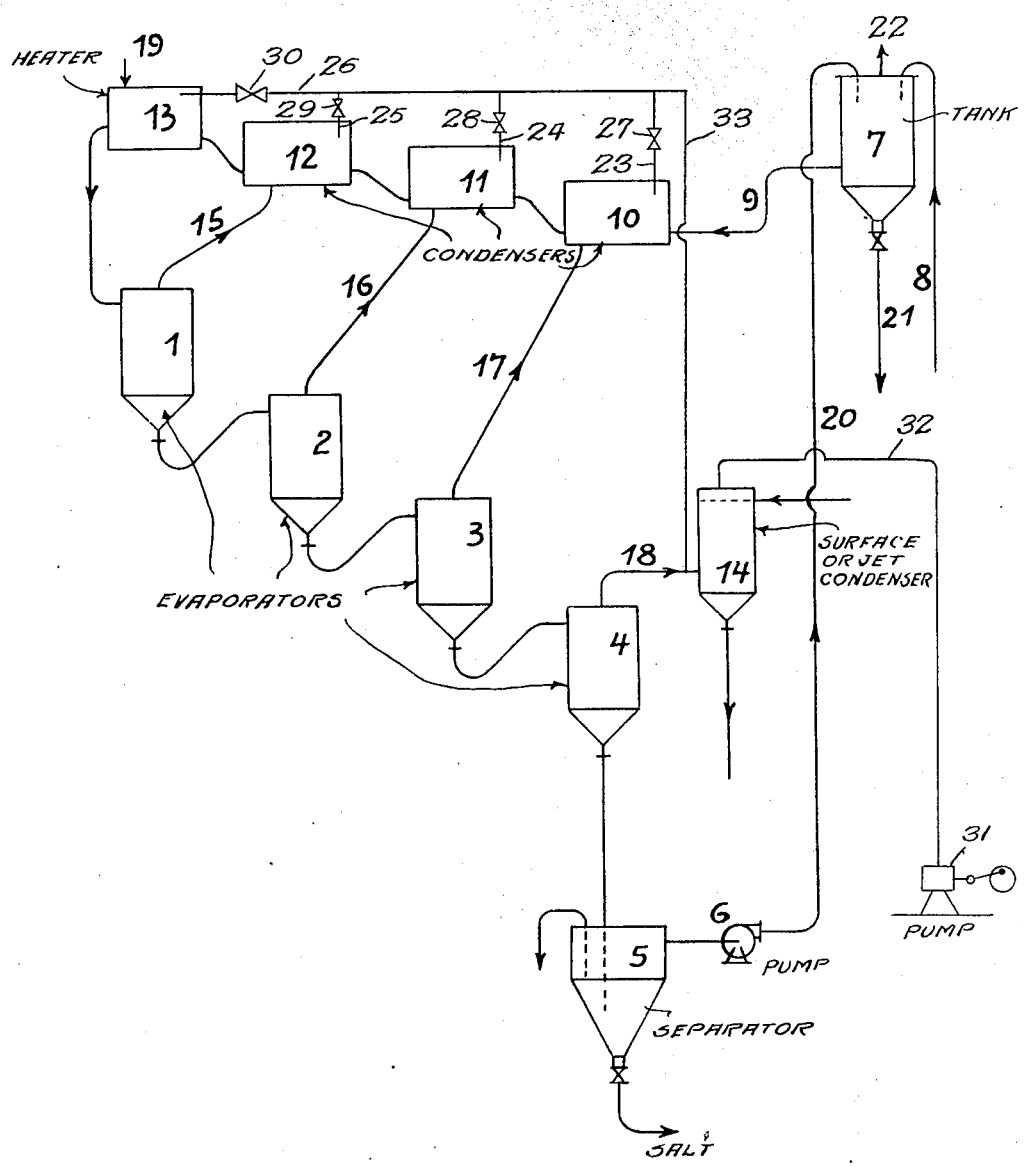

Patented Jan. 23, 1934

1,944,548

UNITED STATES PATENT OFFICE 1,944,548

PROCESS OF THE SEPARATION OF SOLID SUBSTANCES FROM LIQUID BY VACUUM COOLING IN STAGES

Karl Ebner, Frankfort-on-the-Main, Germany, assignor to American Lurgi Corporation, New York, N. Y., a corporation of New York Application June 30, 1932, Serial No. 620,273, and in Germany July 15, 1931

14 Claims. (Cl. 23—1)

This invention relates to a process of and apparatus for the separation of solid substances from liquid by vacuum cooling in stages.

It has already been the practice to separate the solid substances contained in solution in liquids—saline solutions for example—from the liquids by vacuum cooling effected in stages. This has been effected by passing the hot liquid through a succession of evaporators under a progressively increased vacuum, the cooling being performed by extracting from the liquid itself the heat required for the partial evaporation of the liquid. In addition to the cooling, the evaporation also naturally favoured the deposition of the solids from the liquid. The vapours produced in the several evaporators were deposited in condensers, cooled by the cooled liquid after its separation from the deposited solids. This cooled liquid therefore passed through the condensers in the reverse direction to that taken by the liquid to be cooled in passing through the evaporators. If lower cooling temperatures were desired in such plants, one or more additional cooling stages were added, the condensers of which were operated, not by the cooled liquid, freed from the solids, but by another cooling medium, such as cooling water. In order to be independent of the temperature of the available cooling water, the vapours from the evaporators of these additional stages have also been compressed before reaching the allotted condenser.

The present invention relates to additional equipment of a crystallization plant of this kind, operating with a specially added cooling stage. According to the present invention, at least a portion of the liquid which has been freed from the deposited solid substances, is again passed, in association with the liquid to be treated, through the evaporators of the plant, after having served as cooling medium. Any superfluous residue that there may be of the cooled liquid is diverted from the cooling process, and may be utilized in known manner. Notwithstanding that the returned liquid is of a different composition from that which is freshly admitted and from which the solid substances have still to be separated, it has transpired that very noteworthy advantages can be obtained with the process according to the invention.

Apart from an increased evaporative efficiency, the difficulties (deposition on the walls of the evaporators, choking-up the pipes, and the like) arising from the precipitation of solid substances from the liquid are removed by the larger volumes of liquid which are sent through the evaporators.

Further special advantages are obtained when the liquid to be treated contains gases, or gives off gases in cooling. If, for example, solutions of alkali bicarbonates, which also contain other substances (such as salts) are to be freed from these salts by subjecting the solution to vacuum cooling and concentration, carbon dioxide and similar gases are liberated in the evaporators of the vacuum-cooling plant. On the one hand, these gases impair the condenser vacuum, so that the devices for evacuating the condensers have to be considerably enlarged, whilst on the other hand they attack the materials of which the condensers are constructed. If, according to the invention, the bicarbonate solution to be treated is mixed, prior to its introduction into the evaporators of the vacuum-cooling plant, with a portion of the final solution, after this latter has been employed as cooling medium in the condensers of the plant, and brought to the intake temperature of the evaporators, the carbon dioxide and like gases separate out at the time of mixing. Carbon dioxide and like gases can be led out of the mixing vessel and recovered far more easily than from the condensers of the cooling plant. Moreover, the vapours flowing from the evaporators of the cooling plant to the condensers, remain substantially free from carbon dioxide and like gases, thus rendering the operation of the plant substantially simpler, more reliable and more economical. The same result is obtained by mixing the cold, returned concentrated solution with the bicarbonate solution that is to be evaporated, or when bicarbonate solutions are to be treated which do not deposit any, or any appreciable amount, of salts during the concentration and cooling.

In crystallizing carnallite from liquors—such as the saline solutions of the potash industry—which also contain common salt, these solutions are mixed, in the process according to the invention, with the end liquor prior to admitting the latter into the condensers of the vacuum-cooling plant. For example, if the solution to be treated contains 35 grms. of sodium chloride and 280 grms. of magnesium chloride per litre, and the end liquor contains 20 grms. of sodium chloride and 350 grms. of magnesium chloride per litre, the mixture of the two in the proportion, for example, of 1:3, gives a mean content of 333 grms. of magnesium chloride per litre. Since the mixing is performed at a low temperature, the common salt is deposited from the mixed solution, except for about 21 grms. per litre. If, after removing the deposited salt, the mixture of the two solutions be passed through the condensers and a heating apparatus, the subsequent evaporation and cooling in the evaporators of the vacuum-cooling plant will furnish a carnallite salt, which is fairly free from common salt and can be very advantageously worked up by known processes.

In order more clearly to understand the nature of the invention, reference is made to the accompanying drawing, which illustrates diagrammatically and by way of example a typical embodiment of apparatus suitable for carrying out the process of the present invention.

In said drawing, 1, 2, 3 and 4 are the evaporators of the vacuum-cooling plant. The cooled liquid from the evaporator 4 is passed into a vessel 5 for the purpose of separating the deposited salt. The solution, freed from the salt and brought to the desired final concentration, is delivered by the pump 6 either directly into the condensers 10, 11, 12,—in which it serves as cooling medium—or (for example in evaporating carnallite liquor) first to an intermediate tank 7. The warm solution issuing from the condenser 12 is raised, in a heater 13, to the temperature at which the mixture of returned solution and fresh solution is to enter the evaporator 1. The vapours produced in the evaporators 1, 2, 3 flow through the connections 15, 16, 17 into the condensers 12, 11, 10. The condenser 14, which may be designed as a surface condenser or jet condenser, and receives the vapours from the evaporator 4 by way of the connection 18, is operated with a special cooling medium, such as cooling water. The connection 18 may also be provided, in known manner, with a steam jet injector, which increases the vacuum in the evaporator 4, to a corresponding degree by comparison with that of the condenser 14. The vacuum in condenser 14 is maintained by the pump 31 which is connected to the condenser through pipe 32. The condensers 10, 11 and 12 and heater 13 are connected by pipes 23, 24, 25 and 26 respectively with the main conduit 33 which connects with pipe 18 and thus with the condenser 14. The pipes 23, 24, 25 and 26 are provided with valves 27, 28, 29 and 30 and may also be provided with a jet apparatus to aid in maintaining the vacuum. A portion of the vapours produced in the evaporator 4 can, of course, also be profitably utilized, for example, in preheating saline solutions.

The fresh solution from which the salts, for example, are to be deposited can be passed, for example through the pipe 19, into the heater 13 or to a separate mixing vessel. In this it is mixed with the solution which has been brought to the final degree of concentration and freed from the deposited salts, said solution having already served as cooling medium in the condensers 10, 11 and 12 and been further heated up in the heater. The mixture next passes in succession through the evaporators 1, 2, 3 and 4, in order to be freed from the deposited salts in the vessel 5. The cooled solution, or a portion of same, is returned to the condensers by the pump 6, in order to recommence the cycle.

The quantity of liquid maintained in circulation depends on the number of stages in the vacuum-cooling plant and the evaporation of water per litre of solution. If the percentage evaporation is high, a relatively large volume of liquor must be kept in circulation. In most instances the circulating liquid is 3 to 6 times the quantity of the fresh liquid that is to be treated. The amount of external heat to be supplied to the heater 13 of the plant depends on the number of cooling stages and the volume of the returned solution.

If the fresh solution is to be mixed with the cold circulating solution, the pump 6 delivers through the pipe 20 into the tank 7, into which the fresh solution is simultaneously admitted through the pipe 8. The substances deposited during the mixing of the two solutions can be removed from the tank 7 through the discharge pipe 21 and the gases evolved may be removed from the tank 7 through the pipe 22. The mixed solution then passes through the pipe 9 into the condensers of the vacuum-cooling plant. It is raised to the desired temperature in the heater 13 and is passed into the evaporators of the crystallizing plant, in which the further deposition of salt, or concentration by cooling and evaporation, is effected.

I claim:—

1. In the process of recovering solids from solutions thereof comprising passing a solution through a series of evaporators each one of which is maintained at a higher vacuum than the preceding one in the series, passing the vapors from each evaporator to a separate condenser, passing the solution from the last evaporator through said condensers and returning at least a part of the solution leaving the last condenser to the first evaporator, the step which consists in mixing fresh salt solution with the partially evaporated solution after it has left the last evaporator and separating from the resulting mixture any non-liquid material prior to the delivery of the mixture to the first evaporator.

2. A process as claimed in claim 1, wherein the solution from the last evaporator is used as a cooling agent in the condensers attached to the first evaporators in the series and in which the vapors from at least the last evaporator are condensed by means of another cooling agent.

3. A process as claimed in claim 1, wherein the solution from the last evaporator is used as a cooling agent in the condensers attached to the first evaporators in the series and in which the vapors from at least the last evaporator are condensed by means of water.

4. A process as claimed in claim 1, wherein the solution from the last evaporator is used as a cooling agent in the condensers attached to the first evaporators in the series and in which the vapors from at least the last evaporator are injected by means of a jet apparatus into a condenser cooled by means of a different cooling agent.

5. In the process of recovering salts from solutions thereof comprising passing a solution through a series of evaporators each one of which is maintained at a higher vacuum than the preceding one in the series, passing the vapors from each evaporator to a separate condenser, passing the solution from the last evaporator through at least the condensers attached to the first evaporators in series in the opposite direction to the flow of the solution through the evaporators and returning at least a part of the solution leaving the last condenser to the first evaporator, the step which consists in mixing fresh salt solution with the partially evaporated solution after it has left the last evaporator and separating from the resulting mixture any non-liquid material prior to the delivery of the mixture to the first evaporator.

6. Process as claimed in claim 1, wherein any non-liquid material resulting from the evaporation is separated from the solution.

7. Process as claimed in claim 5, wherein any non-liquid material resulting from the evaporation is separated from the solution.

8. Process as claimed in claim 5, wherein fresh salt solution is mixed with the solution leaving the last evaporator and any non-liquid material is separated therefrom before the mixture is passed through the condensers.

9. Process as claimed in claim 5, wherein the solution subjected to evaporation is one which gives off gases on concentration and wherein the gases evolved during the mixing of the solutions are separated before passing the mixture through the evaporators.

10. A process of recovering salts from solutions thereof which comprises heating such a solution, passing the heated solution through a series of evaporators each one of which is maintained at a higher vacuum than the preceding one in the series, separating from the solution any solids precipitated in the evaporators, passing the vapors from each evaporator to a separate condenser, mixing fresh salt solution with at least a part of the partially evaporated solution after it has left the last evaporator, separating from the resulting mixture any precipitated solids, passing the solution through at least the condensers attached to the first evaporators in series in the opposite direction to the flow of the solution through the evaporators, heating the solution leaving the last condenser and delivering it to the first evaporator.

11. A process for crystallizing out carnallite from aqueous solutions containing Carnallite-forming salts, magnesium chloride in large excess and sodium chloride, which comprises heating the solution, passing the heated solution through a series of evaporators each one of which is maintained at a higher vacuum than the preceding one in the series, separating any carnallite precipitated in the evaporators, passing the water vapor from each evaporator to a separate condenser, mixing a large part of the solution leaving the last evaporator with fresh solution, separating from the resulting mixture any precipitated salts, passing the solution through at least the condensers attached to the first evaporators in series in the opposite direction to the flow of the solution through the evaporators, utilizing water as a cooling agent in the remaining condensers, heating the solution leaving the last condenser and delivering it to the first evaporator.

12. A process of recovering salts from solutions thereof which give off gases on concentration, which comprises passing such a solution through a series of evaporators each one of which is maintained at a higher vacuum than the preceding one in the series, passing the vapors from each evaporator to a separate condenser, passing the solution from the last evaporator through at least the condensers attached to the first evaporators in series in the opposite direction to the flow of the solution through the evaporators, mixing a large portion of the solution leaving the last condenser with fresh solution, separating from the resulting mixture any non-liquid material and delivering the mixed solution to the first evaporator.

13. Process as claimed in claim 12, wherein any salts precipitated in the evaporators are separated from the solution and wherein the amount of partially evaporated solution leaving the last condenser which is added to fresh solution is regulated so that the mixture has the desired final concentration after passage through the evaporators.

14. In the process of recovering solids from solutions thereof, comprising evaporating such a solution in a plurality of stages under progressively lower pressure, indirectly contacting residual solution with vapors from said evaporating stages whereby said vapors are condensed and said solution is heated and delivering at least a part of the resulting heated solution to the evaporating stages, the step which consists in mixing fresh salt solution with residual solution after it has left the evaporating stages and separating from the resulting mixture any non-liquid material prior to the delivery of the mixture to the evaporating stages.

KARL EBNER.